Aug. 9, 1949.   W. G. ABRAHAM   2,478,734
SIGNAL DETECTING SYSTEM
Filed April 29, 1944   2 Sheets-Sheet 1
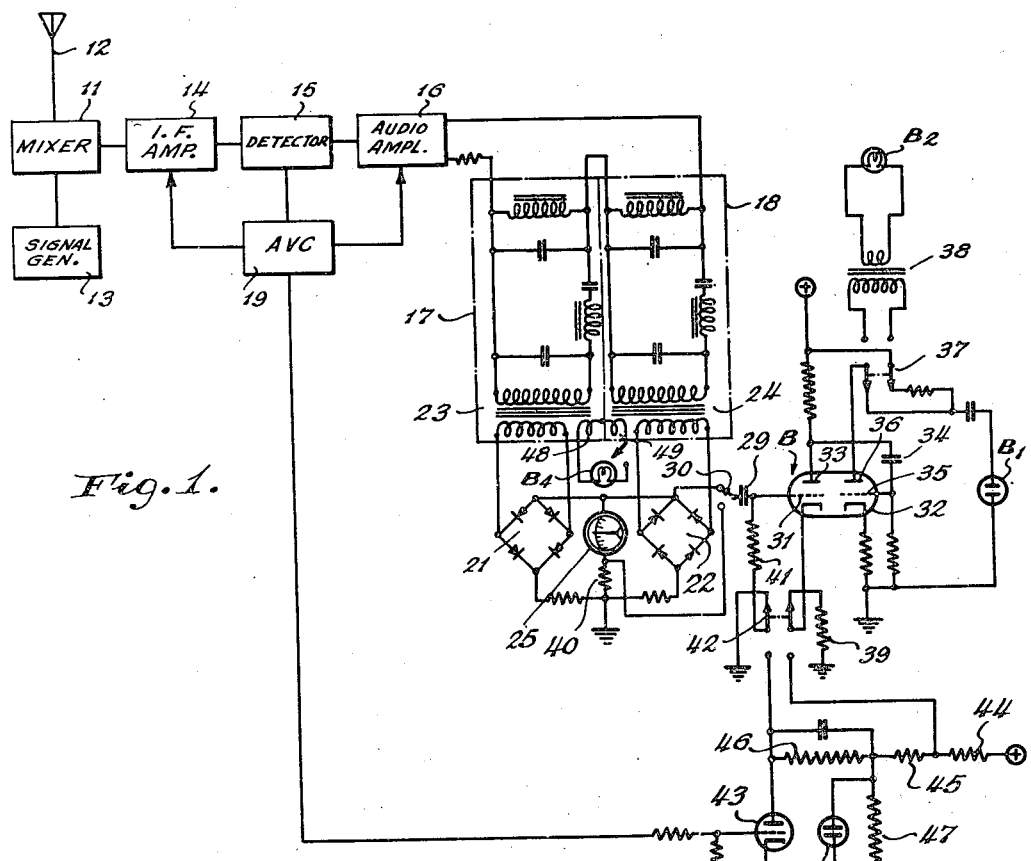
Fig. 1.
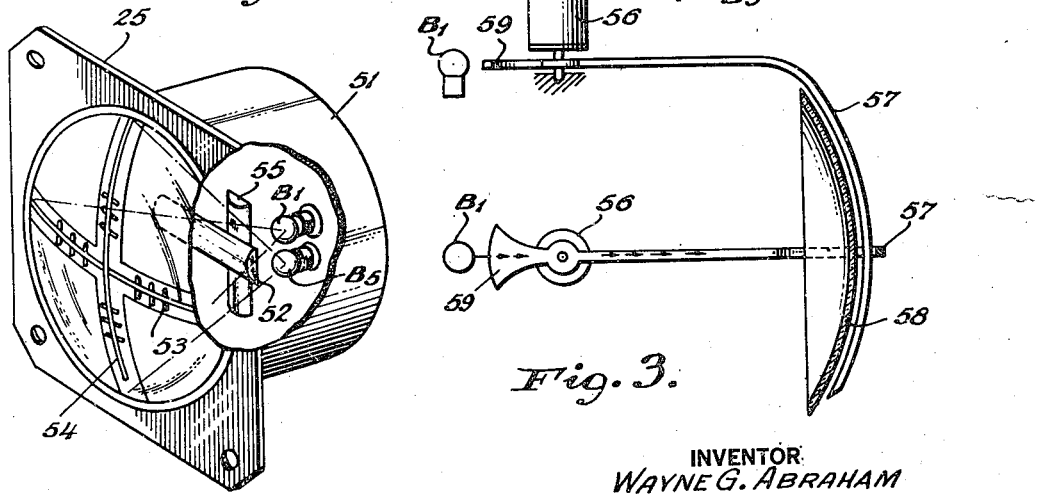
Fig. 2.
Fig. 3.
INVENTOR
WAYNE G. ABRAHAM
BY Paul B. Hunter
ATTORNEY

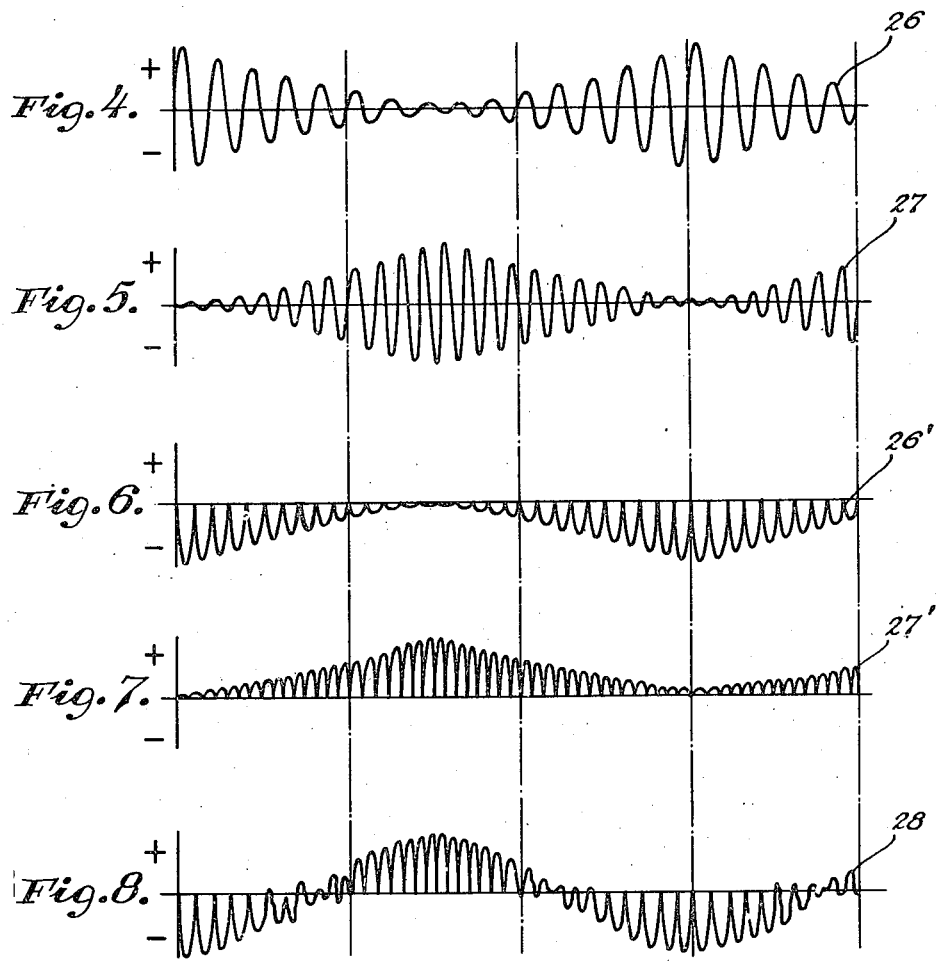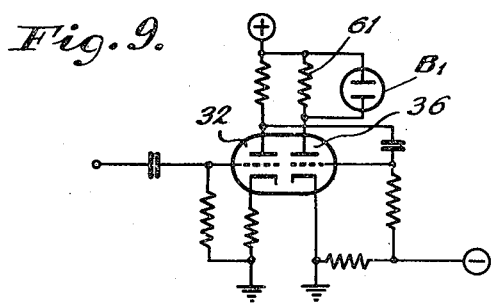

Patented Aug. 9, 1949

2,478,734

UNITED STATES PATENT OFFICE 2,478,734

SIGNAL DETECTING SYSTEM

Wayne G. Abraham, Garden City, N. Y., assignor to The Sperry Corporation, a corporation of Delaware Application April 29, 1944, Serial No. 533,293

14 Claims. (Cl. 343—108)

This invention relates to instrument navigation and, more particularly, to aircraft flight indicators for equi-signal type radio ranges and automatic landing systems. This application is a continuation-in-part of my application entitled Navigation system, Serial No. 500,761, filed September 1, 1943.

It is common practice to determine the orientation of a body relative to a transmitting or receiving station by means of the equi-signal locus formed by overlapping beams of directive radiation. Such a system as applied to a method and apparatus for landing aircraft is disclosed in W. T. Cooke et al. Patent No. 2,307,023, dated January 5, 1943. For convenience in illustration, the present invention has been disclosed as applied to a similar aircraft landing system.

In systems of this type, it is customary to derive signals respresentative of the field strength of the energy contained in the respective overlapping lobes of directive radiation and to denote displacement from the equi-signal locus as a function of the relative strength of the respective signals. Although it is customary in instrument landing systems to define the landing path as the intersection of vertical and horizontal planes defining respectively the localizer and glide paths, the equipment required to indicate each component of displacement is a substantial duplicate of the other. For simplicity in illustration, the present invention is disclosed simply as applied to one such set of equipment, e. g., that defining a glide path.

In my prior application of which this is a continuation-in-part, it has been pointed out that one of the basic defects of an equi-signal system lies in the ambiguity of the neutral on-course indication since the zero center meter, usually employed for the purpose, provides the same indication, both when unenergized and when exposed to balanced signals. This is fundamentally undesirable because the pilot, unaware that the indicator is not operating, may rely upon its neutral indication to denote that he is flying along the equi-signal locus, when as a matter of fact his craft may be displaced dangerously from such locus. In my prior application, I have provided a warning to the pilot by so biasing the indicator that whenever the receiver fails to derive signals properly from the overlapping lobes, the glide path indicator urges the pilot to fly upwardly, the safest general practice whenever the glide path system fails for any reason. The present invention is an improvement on such a fly-up indicator in that it utilizes a simple form of warning, and leaves the course indicator undisturbed. With the present improved system also, the automatic pilot which forms a part of many instrument navigation systems, is not disturbed by any bias signals applied to the meter or course indicator.

One of the principal objects of the present invention is to provide an improved instrument navigation system that discriminates between normal and abnormal neutral instrument indications.

Another object is to provide in an equi-signal indicator, means for determining whether the neutral indication is true or false.

Other objects and advantages will become apparent from the following description and the accompanying drawings.

In the drawings,

Fig. 1 is a diagrammatic view of a typical instrument landing system with the apparatus necessary for providing an indication of displacement from a glide path defined by overlapping lobes of radio energy;

Fig. 2 is a perspective view of an instrument landing indicator or cross-pointer meter for denoting displacement in two planes from the desired flight path;

Fig. 3 is a semi-diagrammatic view of an improved scale and pointer combination of a flight path indicator;

Figs. 4 through 8 are oscillograms of typical wave forms encountered in the operation of the device shown in Fig. 1; and Fig. 9 is a diagram of an alternative arrangement for the signal device.

Generally speaking, the invention comprehends operating warning means, including an audible or visible signal device, as a function of the signals impressed on the equi-signal indicator or meter. In its simplest conception, the invention comprehends utilizing some function of the wave impressed on the indicator, to denote the existence of signals at the indicator, even though the signals, being equal and opposite, fail to produce any displacement indication on the conventional crossed-pointer meter.

In the representative form of the invention disclosed in Fig. 1, a receiver comprising a mixer 11 combines the signals derived from antenna 12 with those received from a signal generator or local oscillator 13 to form intermediate or heterodyne frequency signals that are conducted to intermediate frequency amplifier 14. The amplified signals are rectified and demodulated in detector 15 which transforms the received energy into audio frequency signals, principally the respective modulation components of the overlapping lobes of electromagnetic energy. As a concrete example, it will be assumed that the upper and lower lobes defining the glide path are modulated alternately at 900 and 600 cycles per second. These components are segregated from the signals passing from the detector through audio amplifier 16 as by band-pass filters 17 and 18 selective to 600 and 900 cycles per second, respectively. An automatic volume control (A. V. C.) voltage is produced in an A. V. C. generator 19 as a function of the field strength of the combined lobes. As indicated in Fig. 1, the A. V. C. signal may be applied to the intermediate frequency amplifier 14 in a well known manner, and additionally may be applied to one or more stages of the audio amplifier 16 to decrease the responsiveness of the indicator to given displacements from the equi-signal locus as the craft nears the transmitter.

The respective 600 and 900 cycle components from the filters 17 and 18 are applied to full wave rectifiers 21 and 22 through output transformers 23 and 24. The rectifiers 21 and 22 conveniently may be of the copper-oxide type and are connected in opposition as shown in Fig. 1, so that the voltages developed across the free terminals neutralize one another. An indicator 25 conveniently comprises a conventional d'Arsonval zero-center type meter, whose pointer is free to move in either direction to denote displacement on opposite sides of the chosen course. It will be apparent that for equal and opposite signal components derived by the receiver at points along the equi-signal locus, no displacement indication occurs, and the pilot is advised thereby that his craft is on its course. Should the system fail to receive signals, the indicator 25 likewise would produce a neutral reading, and the pilot would have no way of distinguishing which of the two foregoing conditions exists, unless he were to willfully navigate his craft from the course to check on the response of indicator 25. The warning means B may be made responsive to an alternating component of the derived signals as may be more apparent by referring to Figs. 4 through 8, showing switching cycles for the directive radiation patterns. It is customary to interrupt the energy radiated in the respective lobes at a low audio frequency, typically by switching the radio-frequency energy alternately to the respective lobes intermittently 120 times per second, thereby producing 60 switching cycles per second.

Figs. 4 and 5 illustrate the demodulated radio signals leaving the filters 17 and 18 respectively during switching cycles, the gradual building up and attenuation being the result of the inertia effect of the filters. Thus, in Fig. 4 the signal comprises a 600 cycle wave 26 modulated genererally sinusoidally at 60 cycles per second by the combined action of the switching action and the reactance of the filters. Fig. 5 discloses a 900 cycle demodulated wave 27 likewise switch modulated at 60 cycles, the envelope of which is phase displaced by 180° from the wave 26 as a result of the alternate switching action. Figs. 6 and 7 disclose waves 26' and 27' comprising waves 26 and 27 as they appear following full rectification by rectifiers 21 and 22. Fig. 8 discloses the meter energizing wave 28 representing the algebraic sum of the components 26' and 27'. The wave 28 when applied to a direct current meter such as indicator 25 produces no deflection of the pointer, assuming the components to be equal and opposite, but it is apparent that the 60 cycle envelope component and the 1200 and 1800 cycle per second ripple components are available and may be utilized to denote that signals are impressed on the meter.

These high audio frequency components are applied to the warning means device B and may be utilized to operate a lamp or equivalent warning device. As shown in Fig. 1, signals representing the output of filters 17 and 18, preferably taken directly at the indicator 25, are applied through a coupling condenser 29 to the grid 31 of a first amplifier stage incorporated within tube 32. A second stage may be employed, if desired, and is actuated by feeding energy from plate or anode 33 through coupling condenser 34 to grid 35. A first signal B₁, such as a lamp, is connected to the plate 36 of the second stage through a double-pole, double-throw switch 37, which also connects the plate 36 with a suitable positive plate voltage. With the switch 37 thrown to the lower position, lamp B₁ is energized from the alternating signal components applied to the meter 25. The lamp B₁ preferably is a gaseous discharge tube such as a neon-glow lamp. The grid bias applied to grids 31 and 35 preferably is determined so as to saturate the second stage when a predetermined normal alternating signal level appears across meter 25. Thus, the lamp B₁ does not change its brilliance appreciably over the operating range. It has been found preferable to operate the lamp B₁ on the high frequency audio components of the wave 28, and for this reason the coupling condensers 29 and 34 are chosen so as to attenuate the 60 cycle component thereby minimizing flicker.

It thus is apparent that whenever lamp B₁ is lit, the pilot knows that signals are being applied to the meter 25, and in the event that the pointer thereof provides a neutral indication, he is assured that the receiver otherwise is in an operative condition and is performing satisfactorily. In actual practice, the lamp B₁ is associated with the instrument panel, or may be intimately combined with the indicator 25 as will appear.

A neon bulb B₁ connected as shown in Fig. 1, has been found to be sensitive to extraneous noise pulses resulting in occasional flickering of the tube when the light otherwise should be out. If this is disconcerting, it may be avoided by rendering the lamp insensitive to noise. One simple expedient comprises utilizing a filament type bulb or lamp B₂ connected into the plate circuit of the second stage amplifier as by an impedance-matching transformer 38 having a primary winding connected to the free terminals of switch 37. When the switch is thrown to the upper position, lamp B₁ is disconnected, and lamp B₂ is substituted. Thus, when the second stage of tube 32 is energized, current flows from the plate supply through the primary winding of transformer 38 and applies a suitable voltage to the bulb B₂. This bulb may comprise a conventional flash light bulb operated at several volts, the filament of which is unresponsive to fleeting noise pulses.

The bias for the grid 31 may be obtained by the flow of space current through biasing resistor 39, the bias being applied through grid leak 41 when double-pole, double-throw switch 42 is thrown to the upper position. If desired, however, a variable grid voltage may be employed to establish a threshold precluding flickering of the lamp B₁ from noise pulses, when the receiver is actuated within the normal operating range of the intersecting lobes. Such an arrangement may comprise a control tube 43, the grid of which is controlled by the A. V. C. voltage from generator 19. A group of resistors 44, 45 and 46 are connected in series with the anode of tube 43 to provide the desired variable bias for the tube 32. Resistor 44 is a suitable voltage dropping resistor, while resistors 45 and 46 are biasing resistors, typically of the order of 400 ohms and 100,000 ohms, respectively. The voltage across resistors 45 and 46 is applied as grid bias to the first stage of tube 32 when the switch 42 is thrown to the lower position. A resistor 47 of the order of 10,000 ohms by-passes tube 43. Accordingly, current from a suitable plate supply source may flow through resistors 44, 45 and 47 at all times, and through 44, 45 and 46 when tube 43 is conductive.

In the normal operating range of the instrument-landing system, the A. V. C. voltage from generator 19 blocks tube 43, whereby the bias voltage on grid 31 is generated solely by the current that flows through resistors 44 and 45 and thence through resistor 47, the grid bias being determined by the voltage appearing across resistor 45. Under these circumstances, the tube 32 operates in substantially the same manner as when the switch 42 is thrown to the upper position and bias is provided across resistor 39. However, when the A. V. C. voltage is insufficient to block the tube 43, a condition that prevails when the craft is approaching the operating range of the system, tube 43 conducts and tube 32 is biased well beyond cut-off by the additional voltage developed across resistor 46. During this period no objectionable flickering of the lamp $B_1$ can occur because the noise pulses are unable to unblock the tube 43. Furthermore, the instantaneous nature of the noise pulses gives them a relatively low average value, and they do not affect the A. V. C. voltage sufficiently to block tube 43.

It will be observed that the voltage across resistor 47 varies according to whether tube 43 is conductive or not and it accordingly is possible for a lamp $B_3$ to be connected across 47 as an additional or alternative warning means. Lamp $B_3$ may be attached across enough of resistor 47 as to be operated thereby when tube 43 is blocked and to be extinguished when tube 43 conducts, reducing the voltage across resistor 47.

While the arrangement of Fig. 1 utilizing lamp $B_1$ may be preferred because it denotes the operating condition of all portions of the receiver preceding the ultimate output indicator 25, any other device such as lamp $B_3$, or a lamp connected in other portions of the circuit may be satisfactory for most purposes. A very simple signal arrangement that may operate satisfactory without introducing too much modulation frequency interference comprises a filamentary lamp $B_4$ connected across a pair of supplementary windings 48 and 49 on transformers 23 and 24. If desired, a switch 30 may be used to interchange the input to tube 32 from the rectifier 22 to the lower terminal of meter 25, whereby an alternating input signal is developed across a resistor 40 in series with the meter 25. Such an arrangement provides an input signal of substantially the same strength and at the same time provides a check on the continuity of the meter 25.

To focus the pilot's attention on the warning means and to provide him with a continuous indication of suitable performance of the indicator 25, it is proposed as shown in Fig. 2 to incorporate any one of the lamps shown in Fig. 1 directly within or in intimate relation to the indicator 25. The lamp $B_1$ may be mounted within the indicator casing 51 as shown in Fig. 2, and may be provided with a collimating device such as a lens prism 52 or reflector and suitable shields (not shown) capable of directing the rays from the lamp $B_1$ onto the adjoining scale 53 and pointer 54 to render the two more clearly visible. Although the scale and pointer may be illuminated by the lamp $B_1$ so as to reflect light to the operator or pilot, it is preferred to make the scale, or portions thereof, translucent and to transmit light through the scale. The indicator 25 shown in Fig. 2 is a crossed-pointer meter of the type ordinarily used for instrument landing purposes and incorporates intersecting scales and pointers. Where indication of displacement in two planes is desired, two systems of the type shown in Fig. 1 are usually employed. In such an event, a second lamp $B_5$ serving as the equivalent of lamp $B_1$ may be separately excited within the case 51 in the manner of lamp $B_1$, and may be provided with separate collimating means such as a lens prism or reflector 55 and corresponding shields to direct light along the second scale. Accordingly, if either half of the system fails, the pilot is advised of the fact immediately by the darkening of the appropriate scales of the indicator 25.

Fig. 3 discloses a meter movement 56 having a pivoted pointer 57 formed of translucent material having good light conductive properties, typically quartz or Lucite. The pointer cooperates with a curved scale 58, preferably of contrasting color, and light is transmitted along the pointer as by a lamp $B_1$ suitably disposed relative to the pointer. One possible arrangement, as shown in Fig. 3 comprises a counterbalancing portion 59 extending into proximity with the lamp $B_1$, with the portion flared so as to receive the light rays from the lamp at the various angular positions of the pointer. Light emanating from the lamp $B_1$ travels along the pointer and distinguishes the pointer clearly from the scale. Any failure in receiver operation becomes immediately apparent to the pilot without continuous checking on his part.

Fig. 9 discloses an alternative arrangement of the lamp $B_1$ as applied to a circuit utilizing tube 32 of the type shown in Fig. 1. The principal distinction resides in the fact that in the arrangement shown in Fig. 9, the lamp $B_1$ is connected in series with the plate 36 across a series resistor 61 instead of between plate and ground as shown in Fig. 1.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An aircraft instrument-landing receiver for denoting the position of an aircraft relative to the equi-signal path of a pair of overlapping lobes of distinctively-modulated radio energy, comprising means for deriving modulated signals from each of said lobes, a meter operated by said signals in opposed relation and producing a neutral indication both when unenergized and when said opposed signals are equal, an amplifier responsive to the modulation component of the signals at said meter, warning means adapted to be energized by definite energy responses of said amplifier for indicating by a fixed indication whether signals are applied to said meter, said warning means being adapted to be extinguished abruptly when said signals fall below a predetermined strength.

2. The combination as claimed in claim 1, wherein said warning means comprises a gaseous discharge tube in the output circuit of said amplifier.

3. A course-indicator for dirigible craft comprising a meter having a scale and a translucent pointer cooperating therewith to denote the displacement of said craft from said course, said meter providing an indication of zero-displacement both when unenergized and when exposed to balanced signals normally occurring while said craft is on course, warning means motivated by signals received at the meter for denoting normal operating conditions, and a lamp lighted by said energy when it is above a certain minimum value corresponding to received signals at a dangerous flight position, said lamp directing rays of light along said translucent pointer.

4. The combination, as claimed in claim 3, wherein said translucent pointer is widened at a movable portion thereof adjacent to said lamp to collect light from said lamp as said pointer moves.

5. A crossed-pointer meter for aircraft instrument-landing system having scale and pointer means for denoting vertical and horizontal displacement of said aircraft from a predetermined landing path in response to vertical and horizontal displacement signals, warning means including amplifiers, a first lamp responsive to the energy output of one of said amplifiers at a point above amplifier current cut-off corresponding to a critical vertical displacement signal intensity level, said lamp illuminating that portion of said scale and pointer means indicating vertical displacement, and a second lamp responsive under conditions similar to those above but conditioned by horizontal displacement signals, said second lamp illuminating that portion of said scale and pointer means indicating horizontal displacement.

6. In an equi-signal radio course-defining system for dirigible craft, an indicating meter for denoting craft position having scale and pointer means providing a neutral indication, both when unenergized and when the meter-actuating signals are equal and opposite, means for interpreting which of such condition prevails, comprising amplifier circuit means and a lamp, said amplifier means being connected to said meter and being responsive to balanced and unbalanced signals at said meter for providing energy to said lamp giving a fixed indication of all signal strengths above a point corresponding to a dangerous signal energy reception level, said lamp illuminating said scale and pointer means for indicating normal operating conditions, and means for rendering said lamp unresponsive to fleeting noise pulses.

7. An indicator providing a neutral indication both when unenergized and when responding to equally opposed signals derived from an equi-signal path defined by overlapping lobes of directive radiation, and means for interpreting which of such conditions prevails, comprising warning means connected to, and adapted to illuminate said indicator and being responsive to signals from at least one of said lobes reaching said indicator for providing a fixed indication for all signal strengths above a predetermined value, said indication also providing illumination of said indicator.

8. An indicator providing a neutral indication both when unenergized and when responding to equally opposed signals derived from an equi-signal path defined by overlapping lobes of directive radiation, and means for interpreting which of such conditions prevails, comprising means closely associated with said indicator, part of said means being within the indicator, said last means being adapted to be disabled by signals derived from at least one of said lobes reaching said indicator for providing an abrupt warning when said signals fall below a predetermined strength.

9. In an equi-signal aircraft instrument-landing system, a cross-pointer meter having scale and pointer means for indicating displacement of said aircraft from the landing path, and warning means including amplifier means and a lamp, said amplifier means being connected to said meter and being responsive to balanced and unbalanced signals at said meter for providing energy to said lamp giving a fixed indication of all signal strengths above a predetermined value and for providing a sharply defined loss of said indication when said predetermined signal value is reached, said lamp rendering said scale and pointer means more clearly visible.

10. In an equi-signal radio course-defining system for dirigible craft, an indicating meter for denoting craft position having scale and pointer means providing a neutral indication both when unenergized and when the meter-actuating signals are equal and opposite, and means for interpreting which of such conditions prevails, comprising warning means including a lamp associated with said meter, said warning means being responsive to balanced and unbalanced signals at said meter for providing a fixed indication by said lamp of all signal strengths above a predetermined value and for providing a sharply defined loss of said indication when said predetermined signal value is reached, said lamp illuminating said scale and pointer means, and rendering said scale and pointer means more clearly visible.

11. A course-indicator for dirigible craft comprising a meter having scale and pointer means providing a neutral on-course indication both when said meter is unenergized and when said meter is exposed to balanced signals, and warning means including a lamp and an amplifier biased by at least one of said signals at said meter, said amplifier furnishing energy to light said lamp when said amplifier is operating in a region above cut-off corresponding to a critical signal strength, said lamp illuminating said scale and pointer means for indicating normal operating conditions.

12. An aircraft instrument-landing receiver for denoting the position of an aircraft relative to the equi-signal path defined by overlapping lobes of distinctively-modulated radio energy, comprising means for deriving separate signals from each of said lobes, a meter having a pointer operated by said signals in opposition and providing a neutral or on course indications when said signals are balanced, but which also may provide such indication when insufficiently energized, a control network for deriving a voltage as a function of the received strength of said signals at said meter, and warning means other than said pointer contained in and visible on the face of said meter for impairing the reading of the meter when said voltage falls below a predetermined value.

13. A cross-pointer meter for equi-signal instrument landing systems that provides neutral or on course indications when the meter-operating signals are balanced, but which also may provide a neutral indication when insufficiently energized, an independent warning means other than the cross pointers contained in and visible on the face of said meter and adapted to impair the reading of the meter when in the warning condition, said warning means being responsive to the weakness of the balanced or unbalanced signals received by said meter for impairing the reading of the meter when said meter signals fall below a predetermined strength.

14. A cross-pointer meter, providing a neutral indication both when in an unenergized condition and a condition when responding to equally opposed signals derived from an equi-signal path defined by overlapping lobes of directive radiation, and means other than said cross pointers for distinguishing between such conditions comprising warning means contained in and visible on the face of the meter, said means in the warning condition being arranged to partially obscure the reading of at least one of said pointers when said signals fall below a predetermined strength.

WAYNE G. ABRAHAM.

REFERENCES CITED

The following references are of record in the file of this patent:

UNITED STATES PATENTS

| Number | Name | Date |
| --- | --- | --- |
| 1,827,590 | Kline | Oct. 13, 1931 |
| 2,006,918 | Hahnemann | July 2, 1935 |
| 2,071,284 | Hyland | Feb. 16, 1937 |
| 2,093,885 | Gerth et al. | Sept. 21, 1937 |
| 2,156,809 | Fredrickson | May 2, 1939 |
| 2,270,899 | Roder | Jan. 27, 1942 |
| 2,358,352 | Sherwood | Sept. 19, 1944 |
| 2,393,624 | Ferrill, Jr. | Jan. 29, 1946 |

FOREIGN PATENTS

| Number | Country | Date |
| --- | --- | --- |
| 524,526 | Great Britain | Aug. 8, 1940 |